United States Patent [19]

Fuss

[11] Patent Number: 4,799,830
[45] Date of Patent: Jan. 24, 1989

[54] AIR CONVEYOR DISPENSING AND RECYCLING SYSTEM

[75] Inventor: Gunter G. Fuss, San Mateo, Calif.

[73] Assignee: Free Flow Packaging Corporation, Redwood City, Calif.

[21] Appl. No.: 893,999

[22] Filed: Aug. 7, 1986

[51] Int. Cl.⁴ .............................................. B65G 53/60
[52] U.S. Cl. ..................... 406/117; 406/32; 406/82; 141/67; 141/131
[58] Field of Search .................... 406/28, 31-34, 406/36, 77, 82, 86-91, 106, 109, 197, 122, 127, 137, 138, 146, 191, 198, 181, 51, 117, 118, 93-95; 222/109; 141/67, 93, 129, 131, 134, 115, 163, 45, 115

[56] References Cited

U.S. PATENT DOCUMENTS

| | | |
|---|---|---|
| 3,074,543 | 1/1963 | Stanley . |
| 3,181,916 | 5/1965 | Epstein .................................. 406/88 |
| 3,188,146 | 6/1965 | Cordes . |
| 3,206,255 | 9/1965 | Gray . |
| 3,261,379 | 7/1966 | Stockel et al. . |
| 3,481,455 | 12/1969 | Graham et al. . |
| 3,708,208 | 1/1973 | Fuss . |
| 3,723,237 | 3/1973 | Fuss . |
| 3,728,872 | 4/1973 | Thore .............................. 406/181 X |
| 3,762,772 | 10/1973 | Fuss . |
| 3,774,972 | 11/1973 | Grapengiesser et al. ............. 406/89 |
| 3,932,569 | 1/1976 | Fuss . |
| 3,953,076 | 4/1976 | Hurd ..................................... 406/88 |
| 4,010,981 | 3/1977 | Hodge ................................... 406/88 |
| 4,020,881 | 5/1977 | Nothen ............................. 141/163 X |
| 4,116,491 | 9/1978 | Ply . |
| 4,142,560 | 3/1979 | Eisenberg ....................... 141/115 X |
| 4,147,392 | 4/1979 | Fuss . |
| 4,204,372 | 8/1981 | Smith ................................... 406/106 |
| 4,242,015 | 12/1980 | Persson . |
| 4,413,932 | 11/1983 | Kobak . |

FOREIGN PATENT DOCUMENTS

| | | | |
|---|---|---|---|
| 20275 | 2/1978 | Japan ................................... 406/122 |
| 2073122 | 10/1981 | United Kingdom ................. 406/87 |

Primary Examiner—Sherman D. Basinger
Assistant Examiner—Paul E. Salmon
Attorney, Agent, or Firm—Flehr, Hohbach, Test, Albritton & Herbert

[57] ABSTRACT

A transport system for conveying and dispensing non-fluid fluent material such as free-flowing packaging material includes a recycling system for automatically retrieving spilled material and a reservoir which automatically controls the input of material from a main supply based upon the height of material in the reservoir. Various air transport systems are incorporated.

16 Claims, 5 Drawing Sheets

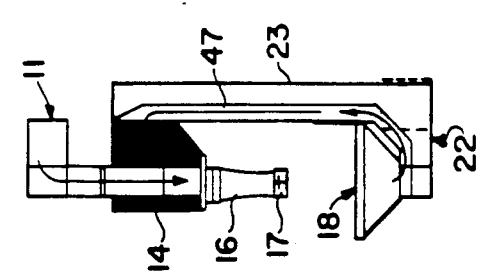
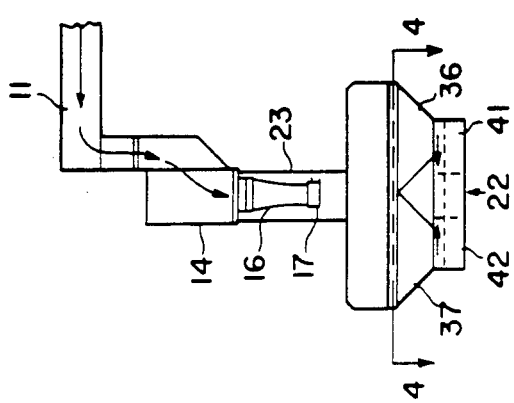
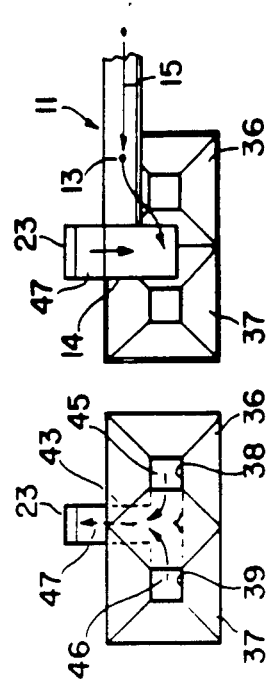
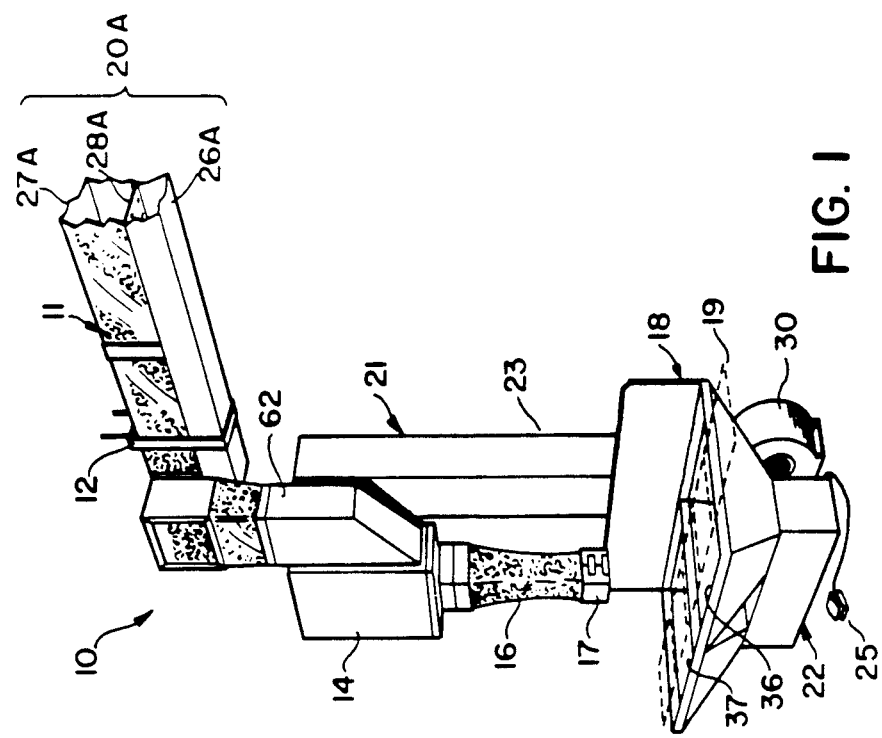

AIR CONVEYOR DISPENSING AND RECYCLING SYSTEM

BACKGROUND OF THE INVENTION

The present invention relates to conveying and dispensing systems for non-liquid fluent material such as free-flowing packaging materials and, in particular, to a pneumatic conveyor system for recycling spilled material.

It is inherent to the dispensing operation of most high throughput air conveyor systems for fluent packaging materials that material is easily spilled. The material spilled while filling containers must then be swept or otherwise picked up and manually returned to the conveyor system, or discarded. Typically, to avoid spillage, each container is loaded in increments by repetitively opening a dispensing valve. Quite obviously, this approach is time consuming and labor intensive.

Several approaches are available for conveying and dispensing loose-fill, free flowing packaging material. For example, Ply U.S. Pat. No. 4,116,491 discloses a hopper for feeding granular materials into a double-walled air conveyor which comprises a porous inner pipe and a concentric outer pipe which is mounted to the inner pipe on spaced, vented baffles. Pressurized air is applied to the center pipe to create a cushion between the pipes and to propel fluent material such as grain along the inner pipe. Persson U.S. Pat. No. 4,242,015 discloses an air conveyor in which the top sheet of a plenum chamber has slits to direct the air flow and entrained granular material from a storage hopper onto a belt conveyor. Regarding dispensing, Cordes U.S. Pat. No. 3,188,146 discloses a hopper which dispenses granular washing products to an automatic washing machine. The materials are fed downward by gravity, then blown upward via an air lift tube into the wash tank. Also, Stockel et al U.S. Pat. No. 3,261,379 discloses a pneumatic granular-type material dispensing system having a vent tube which incidentally acts to feed material back into a storage bin. While these patents may be of interest in defining the general state of the air conveyor art and the dispensing art, they do not provide a viable approach for automatically recycling free-flowing packaging material without spillage.

SUMMARY OF THE INVENTION

In view of the above discussion, it is a principal object of the present invention to provide a recycling system for automatically recovering and reloading material spilled from an air conveyor and dispensing system.

It is a related object to provide a combined air conveyor, dispensing and recycling system in which the same type of air transport is used for conveying and recycling.

It is another related object to provide such a combined system which uses the flow of recycled material to automatically control the input of material from the system supply.

In one embodiment which accomplishes the above objectives, the present invention includes (a) an air conveyor which itself includes a first conveyor system for routing a supply of non-fluid fluent material to at least a selected dispensing point; (b) a dispensing system at the dispensing point which includes a reservoir for the material and a valve beneath the reservoir adapted for selectively opening and closing to dispense the material from the reservoir; (c) collection means including a container disposed beneath the dispensing valve for collecting spilled material, and a second conveyor system connected between the container and the reservoir for returning spilled material from the container to the reservoir; and (d) blower means for providing air under pressure to the first and second conveyor systems for providing material-transporting air flow to these systems.

In another aspect of my invention, the reservoir is of small volume and has lower and upper inlets for the first, supply conveyor and the second, recycling conveyor. These inlets are positioned (1) so that when there is material in the reservoir covering the main supply inlet, the main supply inlet is blocked, and (2) to provide storage capacity above the main supply inlet for the recycled material when the main supply inlet is blocked. Thus, the flow of recycled material into the reservoir automatically controls the ingress of material from the main supply.

Preferably, both the main supply conveyor and the recycling conveyor comprise an air plenum and a conduit. The plenum and the conduit are separated by an apertured plate having angled louvers which direct the flow of air under pressure from the plenum along the conduit.

Alternatively, and particularly where it is useful to decrease the velocity of the material flow, the air conveyor may comprise a fluidized bed in which some of the louvers are angled in the desired flow direction to direct the flow of air and some louvers are oriented transverse to the plane of the louver plate to provide a flow-aiding fluidized suspension action. In addition, other orientations and combinations of louver orientations can be used to provide different air flow action.

In an alternative "waterfall" embodiment, the dispensing valve is omitted or locked open and the recycling system is used to return material whenever a container is not being filled, as well as to return spilled material.

BRIEF DESCRIPTION OF THE DRAWINGS

The above and other aspects of the present invention are described with respect to the drawings in which:

FIG. 1 is a perspective view of a conveyor, dispensing and recycling system which embodies the present invention;

FIG. 2 is a front elevational view of the system of FIG. 1;

FIG. 3 is a side elevational view of the system of FIG. 1;

FIG. 4 is a horizontal section view of the system depicted in FIG. 1;

FIG. 5 is a top plan view of the system depicted in FIG. 1;

DETAILED DESCRIPTION OF THE INVENTION

Figure 6:
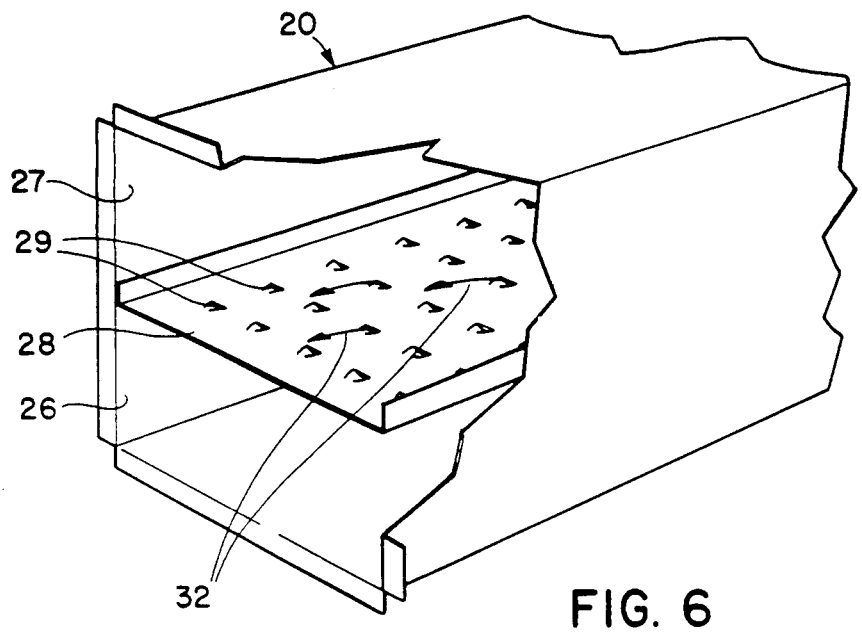
FIG. 6 depicts one embodiment of an air conveyor which is suitable for use in the conveying, dispensing and recycling system of FIG. 1.

The present invention is directed to a system for transporting non-liquid fluent materials such as, but not limited to, those disclosed in commonly assigned Stanley U.S. Pat. No. 3,074,543; Fuss U.S. Pat. No. 3,723,237; Graham U.S. Pat. No. 3,481,455; and Fuss U.S. Pat. No. 3,932,569.

A preferred embodiment 10 of the present air conveying and recycling system is depicted from various vantage points in FIGS. 1–5. FIG. 1 shows a section of one embodiment of an air conveying system 11 which can be used to transport material 13 from a source of supply (not shown) to the system 10. The supply conveyor system 11 is supported by a bracket 12 which is attached to the ceiling, joists, etc. As indicated by arrow 15, FIG. 5, the supply conveyor system 11 transports non-liquid fluent material 13 to a dispensing reservoir or cage 14. From there, the material 13 falls into an enlongated supply hopper 16 for dispensing by device 17 which contains a manually or automatically controlled dispensing valve. While various types of dispensing devices 17 are available, a presently preferred device is disclosed in my commonly assigned co-pending application, U.S. Ser. No. 868,311, titled "DISPENSING DEVICE", filed May 28, 1986. Among other features, the dispensing device disclosed in my co-pending patent application uses manually operated squeeze handles or a pneumatic cylinder or the like to control the opening and closing of a pair of dispensing valves.

Figure 7:
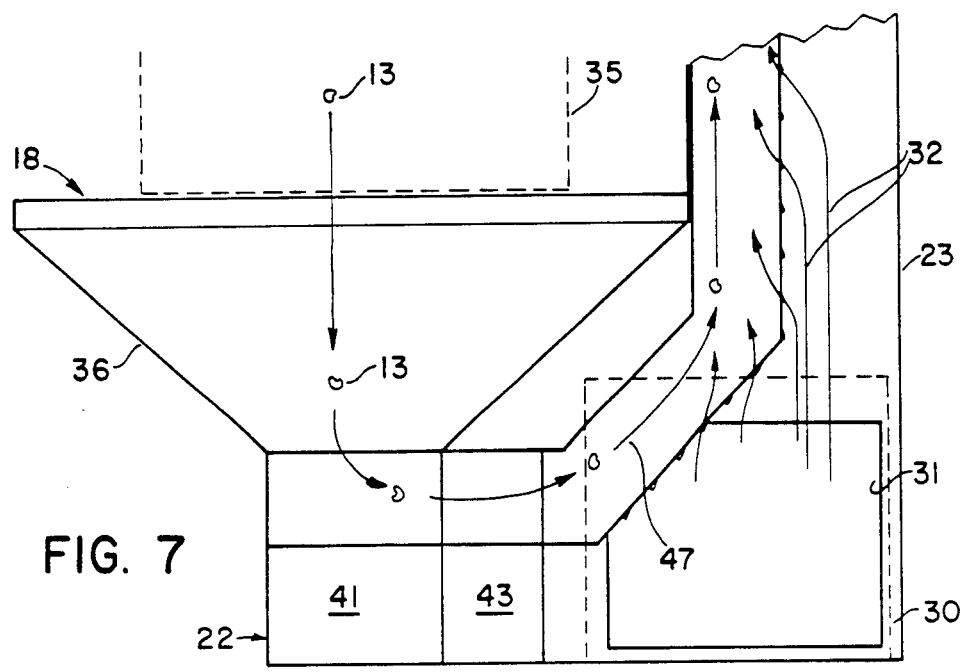
FIG. 7 is a partial, vertical section view of the system depicted in FIG. 1.

Referring to FIGS. 1 and 7, according to my present invention, the material 13 is dispensed from device 17 into a bag or container such as 35 that is positioned on or within a hopper 18. Typically, in high volume operations, containers 35 are transported to and from the dispensing station by a conveyor such as that shown in phantom at 19 in FIG. 1. As mentioned, such a dispensing operation inevitably results in spillage of some of the material 13. In high throughput operations, large volumes of material 13 are conveyed, dispensed and spilled. In the system 10, however, material spilled during dispensing is automatically recycled by a recycling system 21 which includes the hopper 18 and a conveyor 22 at the bottom of the hopper 18 which connects to and feeds material into a vertical conveyor 23 which, in turn, connects to and returns the material to the reservoir 14 to complete the recovery or recycling operation.

Referring now to FIG. 6, the air conveyor units 20 of the recycling system 21 as well as those of the main supply system 11 may comprise a generally enclosed lengthwise-extending air plenum 26 and an adjacent lengthwise-extending perforated or apertured conduit 27. In the embodiment shown in FIG. 6, the two components 26 and 27 are formed by a common wall or screen 28 in a duct or pipe. The wall 28 contains angled louvers 29—29 whose longitudinal axes are oriented in the desired direction or material flow to establish air flow from the plenum lengthwise in the desired direction along the conduit.

One or more air blowers such as blower 30, FIG. 1, connects to the plenums of the supply system 11 and to the plenums of the recycling systems 21 via openings such as 31, FIG. 7. The blowers are operated continuously during system operation. Also, a switch such as foot pedal 25, FIG. 1, can be used to control dispensing valve in device 17. One example of this control system is described in my above-referenced co-pending patent application but the approach can be implemented readily without reference thereto. The blowers establish pressure within the plenum which is greater than the pressure within the conduit. The resulting pressure differential causes air to flow through the angled louvers 29—29 and along the conduit (as indicated by arrows 32—32) for transporting the non-fluid fluent material 13.

Different types of construction can be used in the air conveyors 20. For example, as discussed above regarding FIG. 6, the conveyors of supply system 11 and/or recycling system 21 can be formed by mounting a louvered wall or screen 28 within a duct or pipe of metal or other material to define the plenum 26 and the perforated conduit 27.

In an alternative embodiment 20A which is shown in FIG. 1, the plenum 26A is an enclosed duct which has louvers along one side 28A (illustratively, the upper side). The material transport conduit 27A is formed of an inverted U-shaped enclosure of apertured screening material which is attached across the apertured side 28A of the plenum 26A so that plenum side 28A forms one side of and completes the enclosure of the apertured conduit. Typically, the transported material 13 is visible through the screening material, that is, the conduit 27A provides visible material transport.

Figure 11:
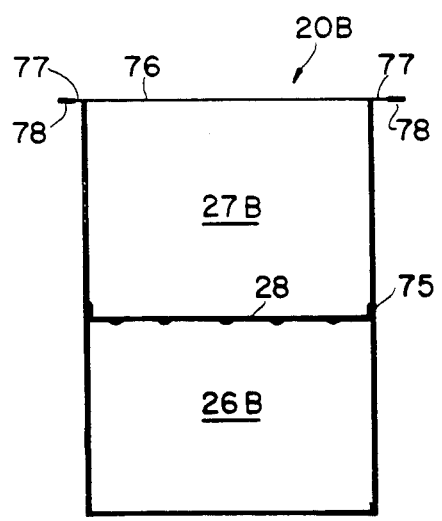
FIG. 11 is a transverse cross-sectional view of a preferred embodiment of my air conveyor.

A presently preferred embodiment 20B of my air conveyor is shown in cross-section in FIG. 11. The conveyor 20B comprises a U-shaped duct body 75. A louver plate 28 mounted within body 75 separates the body into lower air plenum 26B and upper material conduit 27B. Apertured plastic sheet 76 spans the open upper side of the duct body 75, thereby enclosing the material conduit 27B. The sheet 76 may be a heavy-duty polyethylene apertured sheet or screen which is attached to duct flanges 77 by plastic molding strips 78. While other air conveyor constructions will be designed and implemented by those of skill in the art, the construction of FIG. 11 is presently preferred for both supply conveyor system 11 and recyling conveyor system 21 because of its ease of fabrication.

Operation of the individual conveyors in general, and of the recycling conveyor 21 in particular can be understood with reference to FIG. 7. As shown there, material 13 which is spilled enters hopper 18, and falls into one of two hopper bins 36 or 37 (see also FIGS. 1 and 4) and through bottom openings 38 or 39 in the respective bins into the corresponding side 41 or 42 of the underlying T-shaped horizontal conveyor section 22 (see FIGS. 2 and 3) and is then conveyed to vertical conveyor section 23.

Specifically, in the construction illustrated in FIGS. 2–4 and 7, the generally T-shaped base conveyor 22 comprises sections 41 and 42 which are positioned beneath hopper bins 36 and 37 and feed into a transverse center section 43 which, in turn, feeds into the vertical conveyor 23. Conveyor sections 22 and 23 are constructed as shown, for example, in FIGS. 1 or 6. The louvers of sections 41 and 42 are oriented to direct air flow and entrained spillage inwardly in the direction of the arrows 45 and 46 (FIG. 4) to the central base section 43. The louvers of sections 43 and 23 in turn direct the air flow and entrained material upwardly along the path 47 (FIGS. 4, 5 and 7) to the reservoir 14. Thus, during operation of system 10, material which is spilled or simply not loaded into a container is recovered by hopper bins 36 and 37, fed into the base conveyor 22, transported up the vertical conveyor 23, and returned to the reservoir 14 for dispensing. In short, spilled material is automatically retrieved and recycled.

Figure 8:
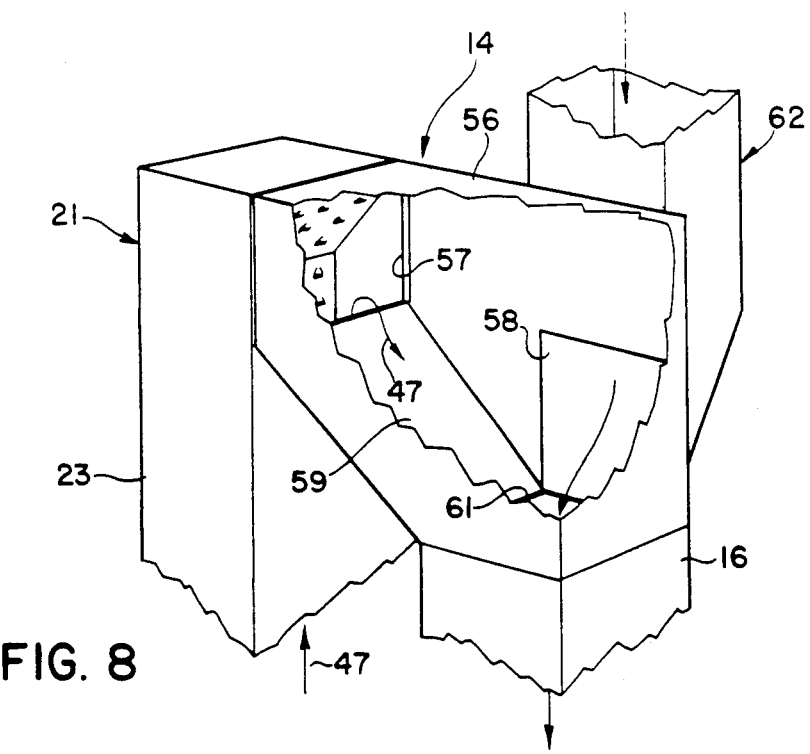
FIG. 8 is an enlarged, partially, cutaway perspective view of a preferred reservoir or recycle hopper.

As shown in the partially cutaway perspective view of FIG. 8, the reservoir or recycle hopper 14 comprises a generally enclosed housing 56 having an opening 57 in the upper rear wall thereof through which the recycling conveyor system 21 transports the retrieved material. Typically, the reservoir housing 56 is formed from perforated material such as sheet metal in order to bleed air. Material from the main supply air conveyor is fed by gravity from the conveyor via stack 62 into the reservoir housing 56 through a second opening 58 in the lower region of one of the housing sidewalls. Due to the small reservoir volume and the positioning of the inlets 57 and 58, the height of the material in the reservoir or recycle hopper 14 automatically controls the gravity feed of material from the main supply conveyor.

That is, air and entrained material enter the relatively small recycle hopper housing 56 flowing in the direction indicated by arrow 47, and flow down the sloping rear wall 59 of the reservoir and past the main supply inlet 58, at which point the recycled material enters supply hopper 16 through opening 61. When the flow of dispensed material is smaller than the flow of material into the recycle hopper 14, the height of the material in hopper 16 increases. If this condition continues, the amount of material builds up in supply hopper 16 and in recycle hopper 14 until the material blocks inlet 58 and effectively blocks ingress of material from the main supply system 11 into the reservoir.

Please note, when there is sufficient material in the reservoir 14 to block ingress from the supply conveyor system 21, there still remains storage capacity in the top of the reservoir 14 to accommodate material in the recycling system 21 enroute to the reservoir via upper inlet 57. Conversely, when a dispensing operation lowers the height of the stored material so that opening 58 is no longer blocked, more material is automatically transferred into the reservoir from the main supply system 21.

It should be noted that with the above-described arrangement, the main supply system 11 can be operated continuously during operation of the conveyor and dispensing system 10. If, then, the recycling system 21 is not operated during periods of non-dispensing, the build up of material in the reservoir 14 still automatically blocks inlet 58 and thereby automatically controls the ingress of material from the main supply system 11.

The above-described recycling capability not only eliminates the need to fill the container in increments to avoid spillage but, in addition, allows a continuous operation in which the recycling system 21 is continuously operated (along with the main supply system 11) and the dispensing valve 17 is always open (or omitted). During this continuous or "waterfall" operation, the reservoir 14 automatically inlets material from the main supply conveyor based upon the level of material in the reservoir. As a consequence of the recycling and the inlet control, containers can be filled as needed. Continuous operation of the recycling system retrieves the entire system output during non-loading periods, as well as retrieving spilled material during container loading operations.

Figure 10:
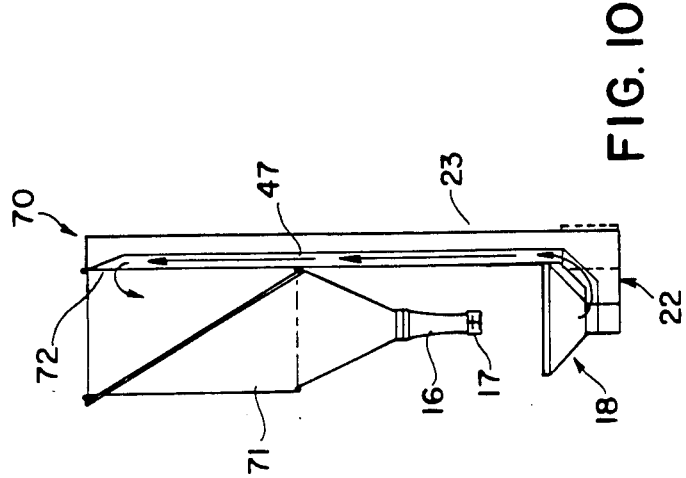
FIGS. 9 and 10 are, respectively, perspective and side elevation views of an alternative embodiment of the present conveyor, dispensing and recycling system.
Figure 9:
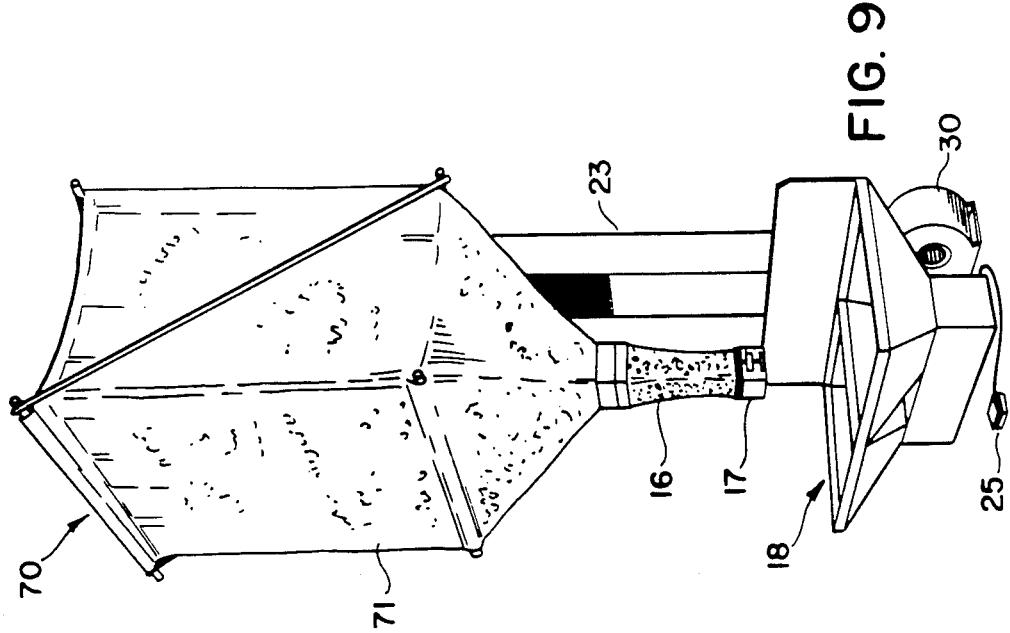

FIG. 9 depicts an alternative embodiment 70 of the conveying, dispensing and recycling system 10 in which a large supply bag or hopper 71 is substituted for reservoir 14. Typically, system 70 is used in relatively small or relatively low throughput self-contained systems which do not use or require a bulk conveyor supply system 11. Instead, supply bag 71 is filled from bags or boxes. Preferably, supply bag 71 is formed of apertured fabric or other porous lightweight material. This self-contained system does not have or require the automatic inlet control which is characteristic of the reservoir 14. Rather, recycled material in vertical conveyor 23 enters supply bag 71 via simple inlet opening 72 (FIG. 10) and is stored in the supply bag for dispensing along with material supplied from boxes or bags.

Figure 12:
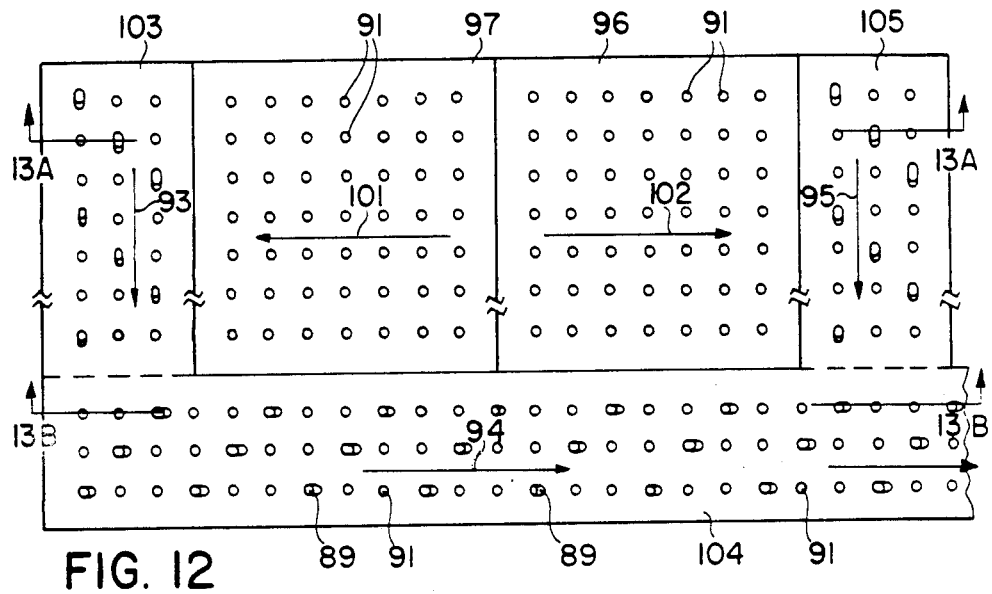
FIG. 12 is a top plan view schematic layout of a fluidized bed dispensing hopper system.
Figure 13A:
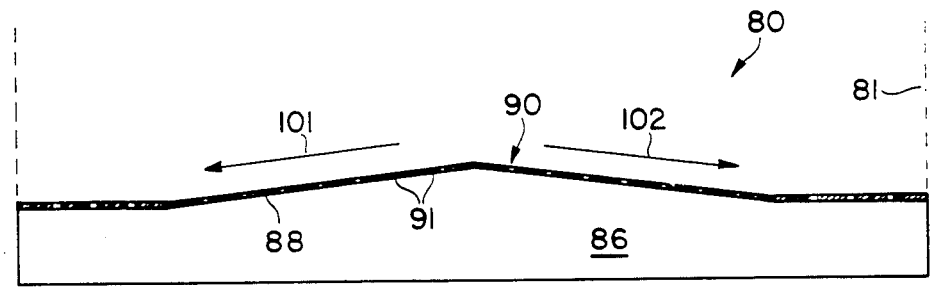
FIG. 13 is a vertical cross-section taken along line 13—13 of FIG. 12.
Figure 13B:
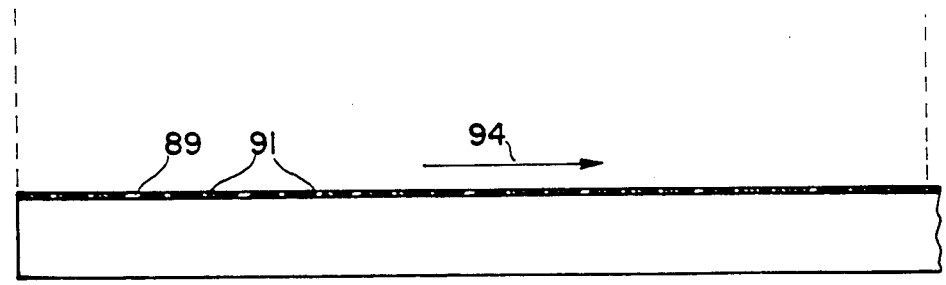

FIGS. 12 and 13 are highly schematized, top plan and vertical section views of a dispensing hopper system 80 which incorporates features of my present invention. System 80 comprises a reservoir 81 such as a walled bag or enclosure and a fluidized bed version 90 of my air conveyor which forms the base of the reservoir. The fluidized bed conveyor 90 comprises an enclosed air plenum 86 having an apertured upper louver plate 88 containing two groups of louvers 89 and 91. Louvers 89 are similar to louvers 29, FIG. 6, in that their longitudinal axis is parallel to the desired direction of air flow and material transport along the conveyor. See, for example, arrows 93–95 in FIG. 12. Louvers 91 are oriented transversely (typically, perpendicularly) to the plane of the louver plate 88 to provide fluidization of the material.

By changing the relative number of louvers 89 and 91, the conveyor 90 can be changed from (1) a pure fluidized support bed in which the louvers impart substantially no net velocity to the material (all louvers 91); to (2) a preferred embodiment incorporating both louvers 89 and louvers 91 which provide fluidized support and a controlled net velocity along a desired direction (such as directions 93, 94, 95); and to (3) a conveyor, similar to air conveyor 20, FIG. 6, which contains substantially all louvers 89 and has substantially little fluidized bed action and great forward velocity.

Dispensing system 80 is designed to provide precisely controlled dispensing of the contents of bag 81 along outer air conveyor sections 103 and 105 into common, end conveyor section 104 and then to an end destination (not shown). The relatively large central region of the fluidized bed or base 88 comprises two sections 96 and 97 which are elevated in the center and slope downwardly towards the outer conveyor sections 103 and 105. Because of the center elevation, sections 96 and 97 can comprise a pure fluidized bed construction of louvers 91. This construction provides an agitating action which allows gravity to empty the contents of the bag 80 down the shallow slope of the regions 96 and 97, as indicated by arrows 101 and 102. That is, gravitational force flows the fluidized material down the sloped surfaces 96 and 97 to the side conveyor sections 93 and 95.

The side sections 103 and 105 and the end air conveyor section 104 into which they feed preferably are fluidized bed conveyors which comprise a mixture of louvers 89 and 91. Louvers 91 are oriented parallel to arrows 93, 94 and 95 in conveyor sections 103, 104 and 105 to transport the material received from center regions 96 and 97 to the destination at the lower right of FIG. 12.

End air conveyor section 104 can be shaped as a trough into which additional material can be fed from supply bags. The relatively slow flow compared to air conveyor 20, and the fluidized bed action permit controlled filling of and transport along the conveyor trough 104 without spillage.

While various methods of constructing fluidized bed louver plate 88 will be readily developed by those of usual skill in the art, in a presently preferred embodiment the plate 88 is an apertured pegboard sheet in which the as-manufactured apertures serve as louvers 91 and supplemental angled louver holes 89 are drilled as required.

Alternatively, by the center fluidized bed sections 96 and 97 can be oriented horizontally by incorporating therein louvers 89 which are oriented to give the desired air flow along the direction 101 and/or 102.

In summary, according to my present invention, a hopper is positioned beneath the dispensing area of an air conveyor system and feeds into a separate air conveyor which returns spilled material to a dispensing reservoir. This recycling feature eliminates spillage of material and the need to load containers incrementally to reduce spillage. The recycling feature allows the dispensing system to operate continuously in a "waterfall" mode in which spilled material is automatically recycled during container filling operations and non-filling periods.

Preferably, the recycling air-conveyor section as well as the supply air-conveyor system comprises an air plenum and a material transport conduit which are separated by a louvered screen which imparts the desired air flow direction to rapidly transport the fluent material along the material transport conduits in whatever vertical, horizontal or intermediate directions are required to implement the supply and recycling of material.

Alternative versions of air conveyor construction are disclosed including a fluidized bed with both material transport and agitation for assisting material flow.

Preferably, the dispensing reservoir is configured as a recycle hopper which is fed both by the recycling conveyor system and the supply conveyor system. This reservoir is designed to automatically control the ingress of material from the supply conveyor system so that a small volume dispensing reservoir can be used and room is always available in the dispensing reservoir for recycling material.

In view of the preferred and alternative embodiments of my system which is described here, it will be appreciated that the scope of the invention is limited solely by the claims and that those of skill in the art will develop other modifications and embodiments based upon the above teachings which are encompassed by the claims.

I claim:

1. An air conveyor and dispensing system for non-fluid fluent material adapted for recycling material, comprising:
   (a) a conveyor system including a first air conveyor for routing a supply of non-fluid fluent material to at least a selected dispensing point;
   (b) a dispensing system at said dispensing point comprising a reservoir for said material and a dispensing valve adapted for selectively opening and closing to dispense material from the reservoir;
   (c) recycling means including a container disposed beneath the dispensing valve for collecting spilled material and a second air conveyor connected between the container and the reservoir for directing material from the container via the upper inlet into the reservoir;
   (d) the reservoir further comprising lower and upper inlets communicating respectively with the first air conveyor and the second air conveyor and being of a selected small volume such that material in the reservoir selectively blocks the entry of material from the first air conveyor through the lower inlet; and
   (e) blower ends for providing air under pressure to the first and second air conveyors for providing air flow therealong for transporting said material.

2. The air conveyor and dispensing system of claim 1, wherein the second recycling air conveyor comprises an air plenum and an adjacent material conveying conduit, both extending lengthwise along the conveyor, and a common wall therebetween; said wall having apertures therein oriented for directing air from the air plenum along the material conveying conduit for providing material-transporting air flow along said conduit.

3. The air conveyor and dispensing system of claim 2 wherein the second, recycling air conveyor further comprises: a hollow body of U-shaped transverse cross-section formed by a base, a pair of sides and an open top; an apertured sheet enclosing the top of said body; and said common wall dividing said body into lower and upper regions forming the air plenum and the material conveying conduit, respectively.

4. The air conveyor and dispensing system of claim 2 wherein the second, recycling air conveyor further comprises: a hollow body of U-shaped transverse cross-section formed by a base, a pair of sides each having a flange at the upper end thereof and an open top; a flexible apertured plastic sheet enclosing the top of the body; means for mounting the sheet to the flanges; and said common wall dividing the body into lower and upper regions defining, respectively, the air plenum and the material conveying conduit.

5. The air conveyor and dispensing system of claim 1 wherein the first, supply conveyor and the second, recycling conveyor each comprises an air plenum and an adjacent material conveying conduit, both extending lengthwise along the conveyor, and a common wall therebetween; said wall having apertures therein oriented for directing air from the air plenum along the material conveyor conduit for transporting material along said conduit.

6. The air conveyor and dispensing system of claim 5 wherein the first and second air conveyors each further comprises: a hollow body of U-shaped transverse cross-section formed by a base, a pair of sides and an open top; an apertured sheet enclosing the top of the body; and said common wall dividing the body into lower and upper regions forming the air plenum and the material conveying conduit, respectively.

7. The air conveyor and dispensing system of claim 5 wherein the first and second air conveyors each further comprises: a hollow body of U-shaped transverse cross-section formed by a base, a pair of sides each having a flange at the upper end thereof and an open top; a flexible apertured plastic sheet enclosing the top of the body; means for mounting the sheet to the flanges; and said common wall dividing the body into lower and upper regions difining, respectively, the air plenum and said material conveying conduit.

8. An air conveyor and dispensing system for non-fluid fluent material adapted for recycling material, comprising:

(a) a reservoir for non-fluid fluent material having a dispensing opening for gravity dispensing of said material into a portable container located at a position beneath said opening;

(b) recycling means including a hopper disposed directly beneath the dispensing opening for direct gravity feeding of spilled material from said reservoir to said hopper and an air conveyor connected between said hopper and said reservoir for directing material from said hopper to said reservoir; and (c) blower means for providing air under pressure to the recycling air conveyor for providing an air flow therealong for conveying said material.

9. An air conveying and dispensing system for non-fluid fluent material adapted for recycling spilled material, comprising:

(a) conveyor system including a first air conveyor for routing a supply of non-fluid fluent material to at least a selected dispensing point;

(b) a dispensing system at said point comprising a reservoir for said material and a valve adapted for selectively opening and closing to dispense material from the reservoir, the reservoir further comprising lower and upper inlets, the lower inlet communicating with the first air conveyor and being of a selected small volume such that the presence of material in the bottom of said reservoir blocks the entry of material from said first conveyor through said lower inlet;

(c) recycling means including a container disposed beneath the dispensing valve for collecting spilled material and a second air conveyor connected between the container and said reservoir for directing material from the container through said upper inlet into the reservoir;

(d) blower means for providing air under pressure to the first and second air conveyors for providing air flow theralong for conveying said material; and wherein (e) said first, supply air conveyor and said second, recycling air conveyor both comprise an air plenum, an adjacent material transport conduit and a common wall; said wall having apertures therein oriented for directing air from the air plenum along the material conveying conduit for transporting material along said conduit.

10. The air conveyor and dispensing system of claim 9 wherein the first and said second air conveyors further comprises: a hollow body of U-shaped transverse cross-section formed by a base, a pair of sides and an open top; an apertured sheet enclosing the top of the body; and said common wall dividing the body into lower and upper regions forming the air plenum and the material conveying conduit, respectively.

11. The air conveyor and dispensing system of claim 9 wherein the first and said second air conveyors further comprises: a hollow body of U-shaped transverse cross-section formed by a base, a pair of sides each having a flange at the upper end therof and an open top; a flexible apertured plastic sheet enclosing the top of the body; means for mounting the sheet to the flanges; and said common wall dividing the body into lower and upper regions defining, respectively, the air plenum and the material conveying conduit.

12. A material dispensing system comprising:

(a) reservoir means including a generally horizontally-disposed base for holding a quantity of non-fluid fluent material on said base;

(b) said base comprising a first air conveyor section for dispensing said material and a second air conveyor section connecting to the first air conveyor section for transporting said material in the reservoir means to the first air conveyor section; and (c) the first and second air conveyor sections of the base each comprising an enclosed air plenum having an upper side for supporting said material and including first and second interspersed groups of apertures, the individual apertures of the first group being oriented to provide the desired direction of flow of said non-fluid fluent material along said upper side and the individual apertures of the second group being oriented transverse to the plane of said upper side to provide fluidization of said material for facilitating transport thereof.

13. A material dispensing system comprising:

(a) reservoir means for holding a quantity of non-fluid fluent material on said base;

(b) said base comprising a first air conveyor section oriented for dispensing said material and a second air conveyor section oriented non-horizontally and connected to the first air conveyor section for transporting non-fluid fluent material in the reservoir means to the first air conveyor section;

(c) the first air conveyor section comprising an enclosed air plenum having an upper side including first and second interspersed groups of apertures, the individual apertures of the first group being disposed in a first orientation to provide the desired direction of flow of sand non-fluid fluent material and the individual apertures of the second group being disposed in a second orientation substantially transverse to the plane of said upper side of the air plenum to provide fluidization of said non-fluid fluent material for facilitating transport thereof along said upper side; and (d) the second air conveyor section comprising an enclosed air plenum having an upper side oriented non-horizontally and including a group of apertures therein, said non-horizontal upper side including a group of apertures therein oriented in said second orientation for providing fluidization of said non-fluid fluent material to facilitate transport thereof by gravity along said non-horizontal upper side.

14. A method for transporting and dispensing a non-fluid fluent material from a supply of said material, comprising:

(a) providing (1) a temporary holding reservoir for said material and (2) an air conveyor;

(b) transporting material from the supply to the reservoir;

(c) at a selected point, dispensing material from the reservoir into containers; and (d) using the air conveyor, returning overflow material from the dispensing point to the reservoir.

15. The dispensing method of claim 14, further comprising:

continuously dispensing said material;

depositing the dispensed material into the containers; and continuously operating the air conveyor for recycling overflow and spilled material both during container filling periods and during non-filling periods.

16. The method of dispensing of claim 15 further comprising using the amount of material in the reservoir to control the transporting of said material from the supply to the reservoir.

* * * * *